(12) United States Patent
Atieque et al.

(10) Patent No.: US 11,386,488 B2
(45) Date of Patent: Jul. 12, 2022

(54) SYSTEM AND METHOD FOR COMBINING PRODUCT SPECIFIC DATA WITH CUSTOMER AND MERCHANT SPECIFIC DATA

(71) Applicant: SHOPIFY INC., Ottawa (CA)

(72) Inventors: Saad Atieque, Toronto (CA); Kyle Bruce Tate, Ottawa (CA)

(73) Assignee: SHOPIFY INC., Ottawa (CA)

( * ) Notice: Subject to any disclaimer, the term of this patent is extended or adjusted under 35 U.S.C. 154(b) by 0 days.

(21) Appl. No.: 16/508,619

(22) Filed: Jul. 11, 2019

(65) Prior Publication Data

US 2021/0012417 A1 Jan. 14, 2021

(51) Int. Cl.
*G06Q 40/02* (2012.01)
*G06N 20/00* (2019.01)
*G06Q 20/12* (2012.01)

(52) U.S. Cl.
CPC .......... *G06Q 40/025* (2013.01); *G06N 20/00* (2019.01); *G06Q 20/12* (2013.01)

(58) Field of Classification Search
CPC ........ G06Q 40/00; G06Q 20/405; G07F 9/02; G06N 20/12
See application file for complete search history.

(56) References Cited

U.S. PATENT DOCUMENTS

| | | | | |
|---|---|---|---|---|
| 2006/0229965 A1* | 10/2006 | Walker | .................. | G06Q 20/20 705/40 |
| 2008/0126267 A1* | 5/2008 | Rosen | .................... | G06Q 40/06 705/36 R |
| 2008/0281726 A1* | 11/2008 | Gupta | ................ | G06Q 30/0601 705/26.1 |
| 2012/0054097 A1* | 3/2012 | Frohwein | ............. | G06Q 20/102 705/40 |
| 2012/0066033 A1* | 3/2012 | Frohwein | ........... | G06Q 30/0207 705/14.1 |
| 2012/0158566 A1* | 6/2012 | Fok | ........................ | G06Q 40/00 705/35 |
| 2017/0278163 A1* | 9/2017 | Aragone | ................ | G06Q 20/12 |
| 2020/0020040 A1* | 1/2020 | Gokhale | ................ | G06Q 10/10 |
| 2020/0327529 A1* | 10/2020 | Mukherjee | ........... | G06Q 40/025 |

* cited by examiner

*Primary Examiner* — Bruce I Ebersman
*Assistant Examiner* — Matthew Cobb

(57) ABSTRACT

Systems and methods are provided for automatically making a decision as to whether or not to over an installment payment (IP) option to a customer at checkout at an online retailer for goods or services. The IP decision is made, at least in part, based on the specific product or products being purchased. In some cases, it is also based on merchant-specific information and/or customer specific information.

11 Claims, 7 Drawing Sheets

Underwriter Management Platform | Search | 602

604 Home   Merchant Statistics   Platform Settings   Finances   Sites/Apps

606 Platform Settings > Installment Payments Configuration

| Buyer Variables | Merchant Variables | Product Variables |
|---|---|---|
| ☐ Include site usage data | ☐ Restrict based on Product type | ☐ Allow high risk products |
| ■ Incorporate purchase history from other stores on platform | ■ Restrict products uncharacteristic to merchant | ■ Banned classifications [View and edit] |
| ■ External credit checking | ■ Restrict new Additions | ☐ Provide merchant with risk information |
| ■ Consider previous chargebacks | Cleared Merchants   Denied Merchants | Classification threshold |
| Fraud threshold | [View and edit] [View and edit] | |
| [90% sure of identity ⇨] | | [80% sure of product class ⇨] |

Total Weighting

[40% Buyer] [25% Merchant] [35% Product]

[Advanced]   [Apply Changes] [Cancel Changes]

608 Installment Payment Notifications

- Merchant John's Apparel has been added to the list of cleared merchants
- Merchant Spa Days has been put on a restricted list of access to installments due to the types of products sold
- Buyer credit information monthly update complete

FIG. 7

SYSTEM AND METHOD FOR COMBINING PRODUCT SPECIFIC DATA WITH CUSTOMER AND MERCHANT SPECIFIC DATA

FIELD

The application relates to systems that allow the use of installment payments in an e-commerce environment.

BACKGROUND

Paying with an installment plan has been common for decades on large life purchases such as houses and cars. More recently, installment plans have been made available for more 'everyday' merchandise or services from stores or online retailers. Providing an installment payment option to customers provides an attractive payment option and may increase sales conversion.

Installment plans have typically been offered to customers based on certain criteria. Namely, the merchant must offer installment plans to their customers, and the installment offer has been contingent on the customer's credit information and rating. Merchants may employ an underwriter to handle the payments and assume the risk of the purchase.

In the case where the merchant uses an underwriter, the underwriter must take on the risk that the customer may default, or submit a chargeback on the purchase due to issues or fraud. In some of those instances, the underwriter takes on the financial risk and may not be reimbursed by the merchant.

It is desired to implement further checking and automation to an installment payment system so as to reduce the likelihood of chargebacks and make installment payments more convenient for merchants, customers, and underwriters.

SUMMARY

Systems and methods are provided for automatically making a decision as to whether or not to present an installment payment (IP) option to a customer at checkout at an online retailer for goods or services. The IP decision is made, at least in part, based on the specific product or products being purchased. In some cases, it is also based on merchant-specific information and/or customer specific information.

Advantageously, this provides increased flexibility in offering IP for the products offered by a given merchant. Some products may be eligible for IP, whereas others may not.

According to one aspect of the present invention, there is provided an automated method in an e-commerce platform comprising: receiving customer input selecting at least one product for purchase; making an installment plan (IP) decision of whether to an offer installment plan purchase option in respect of the at least one product, wherein the decision is made, at least in part on the at least one product selected for purchase; when the decision is not to offer the installment plan purchase option, configuring a checkout user interface to not include the installment plan purchase option, and processing checkout to complete payment of an entire checkout balance; when the decision is to offer the installment plan purchase option: configuring the checkout user interface to include a mechanism to select between the installment plan purchase option and a single payment option; receiving a selection of the installment plan purchase option and the single payment option, and processing checkout using the selected option.

In some embodiments, the method further comprises: using machine learning to determine a product specific variable for products available for purchase, wherein making the IP decision is based on the product specific variable for each of the selected at least one product.

In some embodiments, making the IP decision comprises making a respective IP decision for each of the selected at least one product; configuring the checkout user interface to include a mechanism to select between the installment plan purchase option and a single payment option comprises providing a mechanism to select between the installment plan purchase option and the single payment for each product for which the respective IP decision is to include the installment plan purchase option.

In some embodiments, making the IP decision comprises making a respective IP decision for each of the selected at least one product; the installment plan purchase option is only made available in the checkout user interface if the IP decision is positive for each of the selected at least one product.

In some embodiments, making the decision is also based on a merchant specific variable.

In some embodiments, the method further comprises: maintaining chargeback history for the merchant online sales channel; determining the merchant specific variable based on the chargeback history; from time to time, updating the merchant specific variable to reflect changes in the chargeback history.

In some embodiments, making the decision is also based on a customer specific variable.

In some embodiments, the method further comprises: using a machine learning engine to determine the customer specific variable, the machine learning engine trained using historical data that correlates customer behaviour while interacting with e-commerce platforms with chargeback likelihood.

In some embodiments, the method further comprises: providing a customer facing interface for receiving said customer input as a web page.

In some embodiments, the method further comprises: receiving configuration inputs to configure how the IP decision is made from at least one of: an underwriter configuration interface; a merchant configuration interface.

According to another aspect of the present invention, there is provided an installment payment apparatus comprising: an interface for receiving customer input from a customer facing interface selecting at least one product for purchase; an installment plan (IP) decision generator configured to make an decision of whether to an offer installment plan purchase option in respect of the at least one product, wherein the decision is made, at least in part on a product specific variable specific to the at least one product selected for purchase; a product specific variable determiner configured to determine the product specific variable for the at least one product; a customer facing interface configurator that configures a checkout user interface within the customer facing interface based on the IP decision by: when the decision is not to offer the installment plan purchase option, configuring the checkout user interface to not include the installment plan purchase option, and to process checkout to complete payment of an entire checkout balance; when the decision is to offer the installment plan purchase option, the customer facing interface configurator configuring the checkout user interface to include a mechanism for a customer to select between the installment plan purchase option and a single payment option, to receive a selection between the installment purchase option and the single payment option, and to process checkout using the selected option.

In some embodiments, the installment payment apparatus further comprises: a product specific machine learning engine configured to determine a product specific variable for products available for purchase, wherein making the IP decision is based on the product specific variable for each of the selected at least one product.

In some embodiments, the IP decision generator is configured to make the IP decision comprises making a respective IP decision for each of the selected at least one product; the customer facing interface configurator configures the checkout user interface to include a mechanism to select between the installment plan purchase option and a single payment option by providing a mechanism to select between the installment plan purchase option and the complete payment for each product for which the respective IP decision is to include the installment plan purchase option.

In some embodiments, the IP decision generator is configured to make the IP decision by making a respective IP decision for each of the selected at least one product; the installment plan purchase option is only made available in the checkout user interface if the IP decision is positive for each of the selected at least products.

In some embodiments, the installment payment apparatus further comprises: a merchant specific variable determiner configured to determine a merchant specific variable; wherein the IP decision generator makes the IP decision also based on the merchant specific variable.

In some embodiments, the installment payment apparatus further comprises: a computer readable storage maintaining chargeback history for the merchant online sales channel; wherein the merchant specific variable determiner determines the merchant specific variable based on the chargeback history, and from time to time, updates the merchant specific variable to reflect changes in the chargeback history.

In some embodiments, the installment payment apparatus further comprises: a customer specific variable determiner; wherein the customer specific variable determiner determines a customer specific variable; wherein the IP decision generator makes the IP decision also based on the customer specific variable. making the decision is also based on a customer specific variable.

In some embodiments, the installment payment apparatus further comprises: a machine learning engine configured to determine the customer specific variable, the machine learning engine trained using historical data that correlates customer behaviour while interacting with e-commerce platforms with chargeback likelihood.

In some embodiments, the installment payment apparatus further comprises: an underwriter configuration interface for receiving a configuration inputs to configure how the IP decision is made from an underwriter.

In some embodiments, the installment payment apparatus further comprises: a merchant configuration interface for receiving a configuration inputs to configure how the IP decision is made from a merchant.

According to another aspect of the present invention, there is provided an e-commerce platform comprising the installment payment apparatus described herein.

BRIEF DESCRIPTION OF THE DRAWINGS

Embodiments of disclosure will now be described with reference to the attached drawings in which:

FIG. 2 is an example of a home page of a merchant, according to one embodiment;

FIGS. 5-7 depict graphical user interfaces that may be used by a customer, merchant, and underwriter, according to one embodiment.

DETAILED DESCRIPTION

The present disclosure will now be described in detail by describing various illustrative, non-limiting embodiments thereof with reference to the accompanying drawings and exhibits. The disclosure may, however, be embodied in many different forms and should not be construed as being limited to the illustrative embodiments set forth herein. Rather, the embodiments are provided so that this disclosure will be thorough and will fully convey the concept of the disclosure to those skilled in the art.

Figure 1:
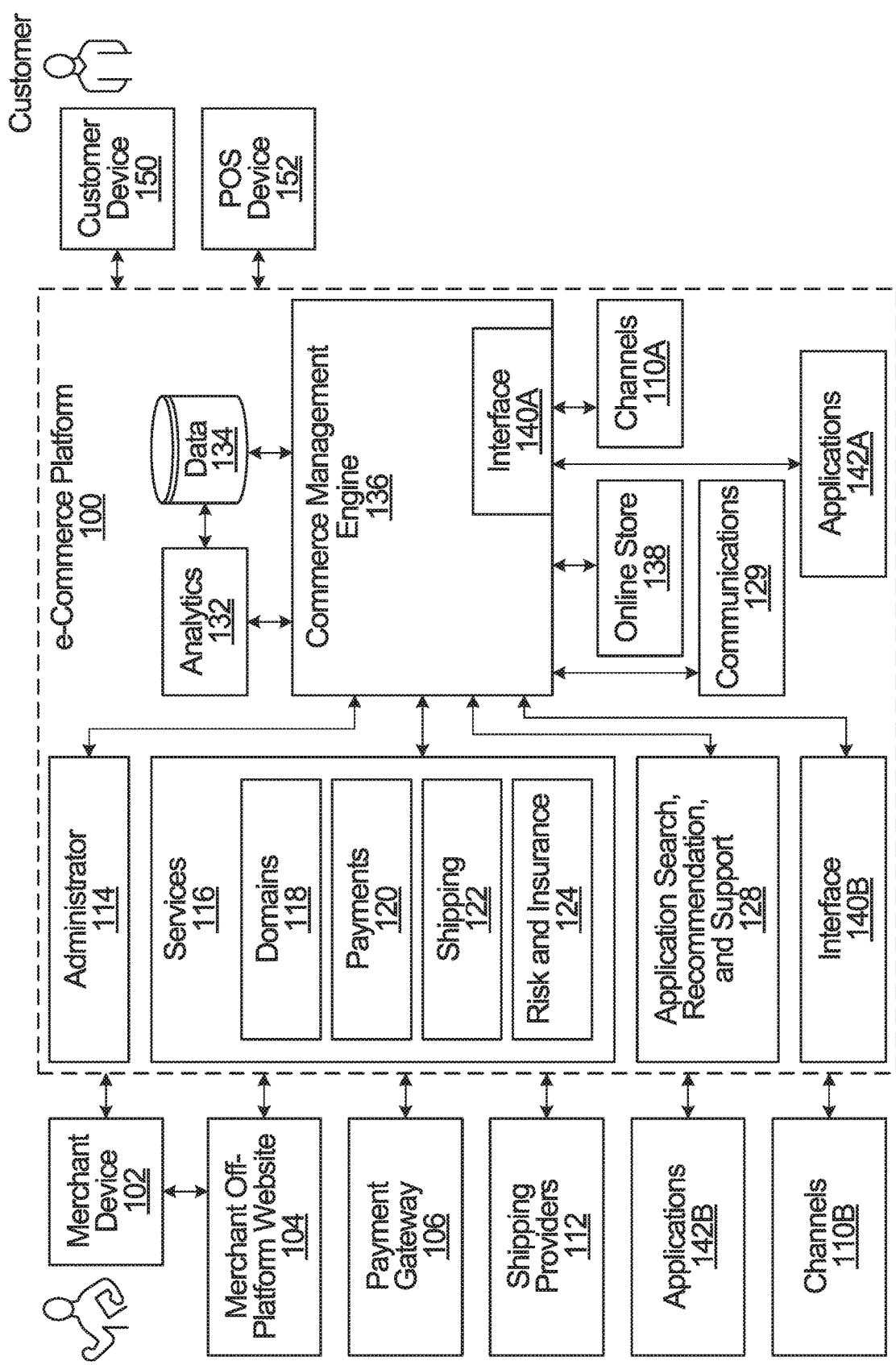
FIG. 1 is a block diagram of an e-commerce platform, according to one embodiment.

With reference to FIG. 1, an embodiment e-commerce platform 100 is depicted for providing merchant products and services to customers. While the disclosure throughout contemplates using the apparatus, system, and process disclosed to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

Figure 2:
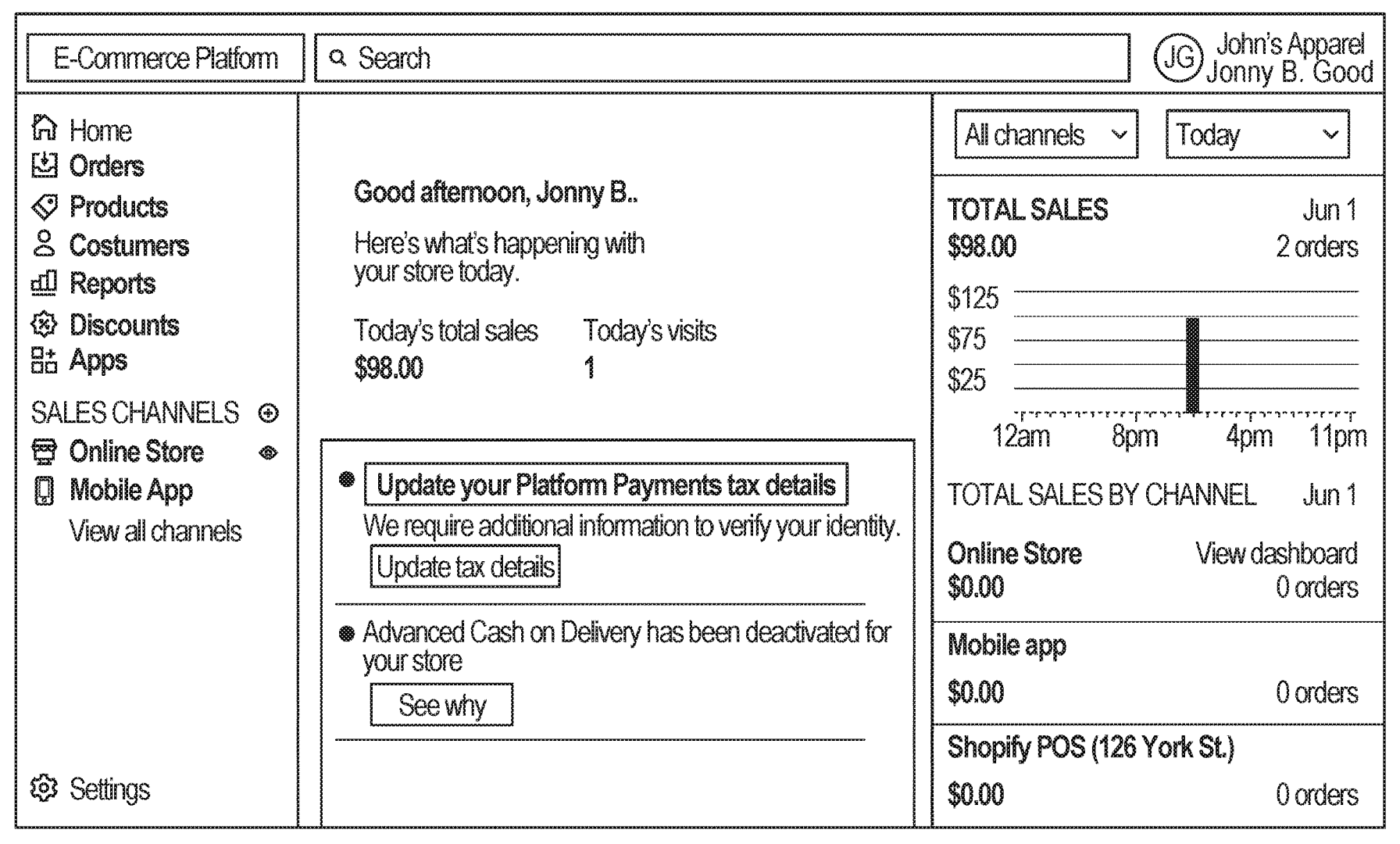

FIG. 2 depicts a non-limiting embodiment for a home page of an administrator 114, which may show information about daily tasks, a store's recent activity, and the next steps a merchant can take to build their business. In embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's back account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In embodiments, an application 142A may be provided by the same party providing the platform 100 or by a different party. In embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In embodiments, rather than violating the isolation principle, it may be preferred to move these components out of the commerce management engine 136 and into their own infrastructure within the e-commerce platform 100.

In embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In embodiments, core products, core extension points, applications, and the administrator 114 may be developed to work together. For instance, application extension points may be built inside the administrator 114 so that core features may be extended by way of applications, which may deliver functionality to a merchant through the extension.

In embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like. Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like) . For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In embodiments, partners, application developers, internal applications facilities, and the like, may be provided with a software development kit (SDK), such as through creating a frame within the administrator 114 that sandboxes an application interface. In embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In embodiments, update events may be queued and processed asynchronously from a state change that triggered them, which may produce an update event notification that is not distributed in real-time.

In embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In embodiments, the payment gateway 106 may accept international payment, such as integrating with leading international credit card processors. The card server environment may include a card server application, card sink, hosted fields, and the like. This environment may act as the secure gatekeeper of the sensitive credit card information. In embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represent an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In embodiments, the e-commerce platform 100 may enable merchants to keep track of changes to the contract of sales over time, such as implemented through a sales model component (e.g., an append-only date-based ledger that records sale-related events that happened to an item).

An e-commerce platform may be providing sales channels for multiple merchants, for their respective customers, and for varying types of merchandise. The decision of whether to offer an installment payment plan on a given purchase is similar to an underwriting decision, in the sense that credit for the unpaid amount of a purchase is being extended to the purchaser. The party extending the credit is the underwriter. Various risks can be assessed in making this decision, including for example, is implemented to include an installment payment offer that can be included at checkout.

When a purchaser makes a purchase on an installment plan, the underwriter pays the merchant, and then the underwriter collects the payments over time to recover the payment. For example, if a payment P is paid over 3 installments, I1, I2 and I3, the cashflow might look like:

|  | Customer: | |
| --- | --- | --- |
|  | underwriter | Merchant |
| Underwriter pays merchant | −P = −I1 − I2 − I3 | P = I1 + I2 + I3 |
| First installment | −I1 | +I1 |
| Second Installment | −I2 | +I2 |
| Third Installment | −I3 | +I3 | where the installment payments from the customer to the underwriter are typically made by credit card, debit card, transaction account, or another payment mechanism that is accepted by the payment gateway. Typically, installment payments following the first use the same payment mechanism.

The above is a very simple example; in reality, there might also be interest expenses passed on to the customer, and/or underwriting expenses passed on to the merchant.

If the purchaser then returns the item to the merchant in the conventional fashion for a refund, the merchant works with the underwriter to refund the paid installments to the purchaser, and refunds the unpaid installments to the underwriter to close the loop, and the underwriter does not experience a loss. For example, if a return happens after the initial installment payment, the cashflow might look like this:

|  | Customer: | |
| --- | --- | --- |
|  | underwriter | Merchant |
| Underwriter pays merchant | −P = −I1 − I2 − I3 | P = I1 + I2 + I3 |
| First installment | −I1 | +I1 |
| Underwriter refund Customer | +I1 | −I1 |
| Merchant pays back underwriter | −P = −I1 − I2 − I3 | P = I1 + I2 + I3A |

An alternative cash flow may look like this:

|  | Customer: | |
| --- | --- | --- |
|  | underwriter | Merchant |
| Underwriter pays merchant | −P = −I1 − I2 − I3 | P = I1 + I2 + I3 |
| First installment | −I1 | +I1 |
| Underwriter refund Customer | +I1 | −I1 |
| Merchant pays back underwriter | I2 + I3 | −I2 − I3 |

A conventional chargeback is the reversal of a credit card payment that comes directly from an issuer which is an entity, such as an issuing bank, that issues accounts and debit/credit cards directly to consumers. A capturer, such as a capturing bank, is an entity that obtains payments, typically from the issuer, for the merchant. For merchants, chargebacks can be a frustrating threat to livelihood. For customers, chargebacks represent a shield between the customer and dishonest merchants.

In the installment payment context, a chargeback is a reversal of payments by the consumer to the underwriter, again typically the reversal of a credit card payment, that comes directly from an issuer.

On the outside, chargebacks can appear very similar to traditional refunds, yet there is one very relevant difference: rather than contact the merchant for a refund, the consumer is asking the issuer to forcibly take money from the capturer. An investigation follows, and if the capturer feels the cardholder's request is valid, funds are removed from the underwriter's account and returned to the consumer; the consumer, on the other hand, is in no way obligated to return whatever was purchased. Mechanically, this may be realized through a request through the capturing bank which the removes the funds from the "underwriter's account"

Unlike the situation with the refund, with a chargeback (or some other installment default), the underwriter may be out of pocket for the amount paid to the merchant. In most cases, the underwriter assumes the risk of the purchase, so the merchant is under no obligation to reimburse the underwriter. Note that this is credit extension, and not a purchase transaction, the underwriter is effectively purchasing the future value of the debt for the price of the transaction. The following is an example of a cashflow where chargeback occurs after the initial installment:

|  | Customer: | |
| --- | --- | --- |
|  | underwriter | Merchant |
| Underwriter pays merchant | −P = −I1 − I2 − I3 | P = I1 + I2 + I3 |
| First installment | −I1 | +I1 |
| Underwriter refund Customer | +I1 | −I1 |

In an instalment case, there may be a refund period available where the customer can return the item to the merchant, and the merchant could send the money back to the underwriter. However, if the item is beyond a refund period, and the customer choses to do a chargeback on an instalment payment, then the underwriter would likely start collection actions against the customer, the merchant would likely not be involved. In this case, the agreement would be between the underwriter and the customer where the underwriter extends credit to the customer, and the underwriter pays out the merchant. The underwriter likely would need to conduct collections actions if the customer refuses to pay their instalment payments as the merchant is out of the picture by this point.

Chargebacks/defaults can occur for various seasons. Some of these reasons are the blame of the merchant, and include:

a) product not received—this occurs when the merchant does not ship the product or makes a shipping error;

b) Product unacceptable—this occurs when the merchant ships the product, but there is something wrong with the product.

Some of these reasons are attributable to the customer, and include:

a) Identity Fraud—this occurs when the person making the purchase is not who they say they are. In this case, when the cardholder discovers the purchase, they will instigate a chargeback.

b) Chargeback Fraud—this occurs when the person making the purchase illegitimately claims a chargeback on a legitimate purchase. For example, the person can claim the chargeback on a product that is completely acceptable, and then keep the product even though they have been reimbursed, thereby obtaining the product for free.

The option of offering installment payments (IP) at checkout on an e-commerce has been made based on:

Merchant—installment payments offered for purchases from a given merchant or not;

Customer—credit history, etc; IPs offered based on the customer's credit history.

It is observed that some products have an increased associated risk of fraud or chargeback. For example, if any person buys a hoverboard, without taking into account who the merchant is or who the customer is, there may be a higher statistical likelihood of fraud/chargeback than if any person buys a stove. It may be too risky to justify offering installment payments on certain products. Existing installment decisions are not product specific, but are the same for all products offered by a given merchant. As such, installment payments may initially be offered for purchases from a specific merchant deemed not to be selling risky products; when that merchant starts to sell risky products, the IP option is removed for all products sold by the merchant, including the non-risky ones.

Product Specific Component into IP Decision

In accordance with an embodiment of the invention, a product specific component is included in the IP decision. This will allow IP to be offered for some products of a merchant, while not being offered for other products of the merchant. Up to three variables input to IP decision are determined:

1) Merchant-Specific Variable: M

Merchant variable (e.g. M) is based on the merchant offering the product for sale. Individual merchants have their own creditworthiness based on the quality of their service and likelihood they will incur chargebacks or cooperate with the underwriter. This can be based on past chargeback history for the merchant. For example, if 50% of products from a given merchant received chargebacks, then IP should not be offered at all. The merchant variable represents a measure of risk, associated with the merchant, to the underwriter. The merchant variable may also be based on whether a given merchant would benefit from IP. The merchant variable may be modified over time to reflect evolving transaction history.

2) Product-Specific Variable: P

The product-specific variable (e.g. P) is associated with the specific product being purchased, and reflects a measure of whether IP should be offered for that product. This can be a binary yes/no variable, or a value within a range, for example. In some embodiments, products are sorted into a plurality of risk categories. Which specific products are eligible for IP may, for example, be determined based on historical chargeback fraud. For example, based on historical behaviour, it may be appropriate to allow t-shirts to be purchased with IP, but not hair extensions. In some embodiments, the product-specific variable is entered on a different timeline than the IP decision. The variable can be entered as products are added to the merchant's catalogue, and can be updated from time to time to reflect the outcome of transactions. In some embodiments, the product-specific variable P, is surfaced to the merchant when products are added to the inventory.

In some embodiments, for at least some products, in determining the product-specific variable P, historical data is combined from multiple merchants that sell the product or similar products, and a single value for P is determined that is used for the product for any merchant.

In some embodiments, for at least some products, in determining the product-specific variable P, historical data is considered only from a specific merchant that sells the product or similar products, and a merchant-specific value for P is determined that is used for the product offered by the specific merchant.

The product-specific variable is product specific, so if there are multiple items in a shopping cart, there are multiple respective product-specific variables.

In some embodiments, machine learning (ML) is used to perform product classification. An input to the machine learning is a product-specific training dataset that maps an initial set of products (and associated training data, including for example, label data, description, title, image) to a risk category code of some sort, or more generally to a value of the associated product specific variable P. Then, associated data for products not included in the initial set are input to a machine learning algorithm for classification.

Note that ML algorithms are not perfect, and there will be some potential for erroneous classifications, that result in IP being extended where it otherwise would not, or withheld where it otherwise would be. The amount of erroneous classifications can be monitored over time to determine whether the algorithm is producing results with acceptable risk.

3) Customer-Specific Variable: B

The customer-specific variable (e.g. B) is associated with the specific customer. In some embodiments, for a new customer, there is a signup process to collect information and authenticate the customer. It is important to be able to ensure that the installments are in the right person's name.

The customer-specific variable may be based on, for example one or more of:

transaction history for the customer—a customer with repeated purchases with no chargebacks would be less risky than a customer with a history of chargebacks;

locally maintained, or $3^{rd}$ party credit information—this can be used to minimize identity fraud; note this can factor in a consideration of the amount of the purchase, and the credit available to the specific customer. In some embodiments, the credit available for IP purchases for a given purchaser is adjusted over time as a function of historical activity.

customer—e-commerce system interactions—certain behaviors of customers when interacting with e-commerce systems can be tracked and correlated with chargeback. Examples include length of time browsing the product web page, checkout history, types of products bought/interested in—frequent high risk purchaser, outside general area purchases (e.g. someone with a history of interest in clothing buys kitchen appliances); number of visits to an item's page.

In some embodiments, machine learning is used to determine a metric based on the third category of customer-specific information above. Historical data that correlates information about checkout history, customer behaviour etc. with chargeback likelihood is used to train an AI engine, and then in determining the customer-specific variable B for a specific transaction, the AI engine is executed based on current values for such information.

Various parameters such as the examples above can be combined to generate a value for the customer specific variable. Alternatively, multiple customer specific variables may be determined on respective bases.

Make IP Decision

The IP platform automatically generates an IP decision in time to present to the customer in the checkout page. It is not practical or realistic at this stage to have any human involvement; convenience is paramount for online shopping and any delay may turn the customer away. In the most general sense, the IP decision is some function of P, and optionally also of M and B. For example, IP=yes/no=F(M,P,B). The output of the IP decision determines whether IP will be offered at checkout for the particular product.

In some embodiments, the function F generates a weighted sum of the inputs:

$$F=w_1M+w_2P+w_3B$$

where $w_1$, $w_2$, and $w_3$ are configurable weights.

In some embodiments, one or more of M,P,B is a binary value that must be true for F to be true. For example, if P is binary (0 or 1) and must be true, F could be expressed as $F=P \times F_1(M,B)$.

In some embodiments, a combination of the above is used, such that one or more of the values must pass a binary test to be true for F to be true, and the result of the F is affected by their weighted sum. For example, F could be expressed as $F=M \times P \times B \times F_1(M,P,B)$.

In some embodiments, a merchant provided input is also factored into the IP decision. If a given merchant does not want IP offered at all, then this merchant provided input indicates this, and is used on making the IP decision.

In some embodiments, the function output may be classified with one or more threshold values that will affect the IP offer. One or more set points may affect the length of the term offered, the interest rate, and the leniency of the payments.

In some embodiments, F is configured such that if a value for B reflects a sufficiently low risk, then F=1 irrespective of the value for M and/or B. For example, if a specific customer has a very strong transaction history over multiple IP transactions, they might be offered for a product normally associated with high risk.

As noted above, the product-specific variable is product specific, so if there are multiple items in a shopping cart, there are multiple respective product-specific variables. In some embodiments, a respective interim IP decision is made for each product, and the overall IP decision is yes, only if the interim IP decision is yes for every product in the cart.

In some embodiments, a respective IP decision is made for each product, and the customer is offered IP for the products with "yes" as the respective IP decision, and are not offered IP for the products that have "no" as the respective IP decision.

In some embodiments, the IP decision can be based on other variables, such as a maximum amount of credit to be offered.

Figure 3:
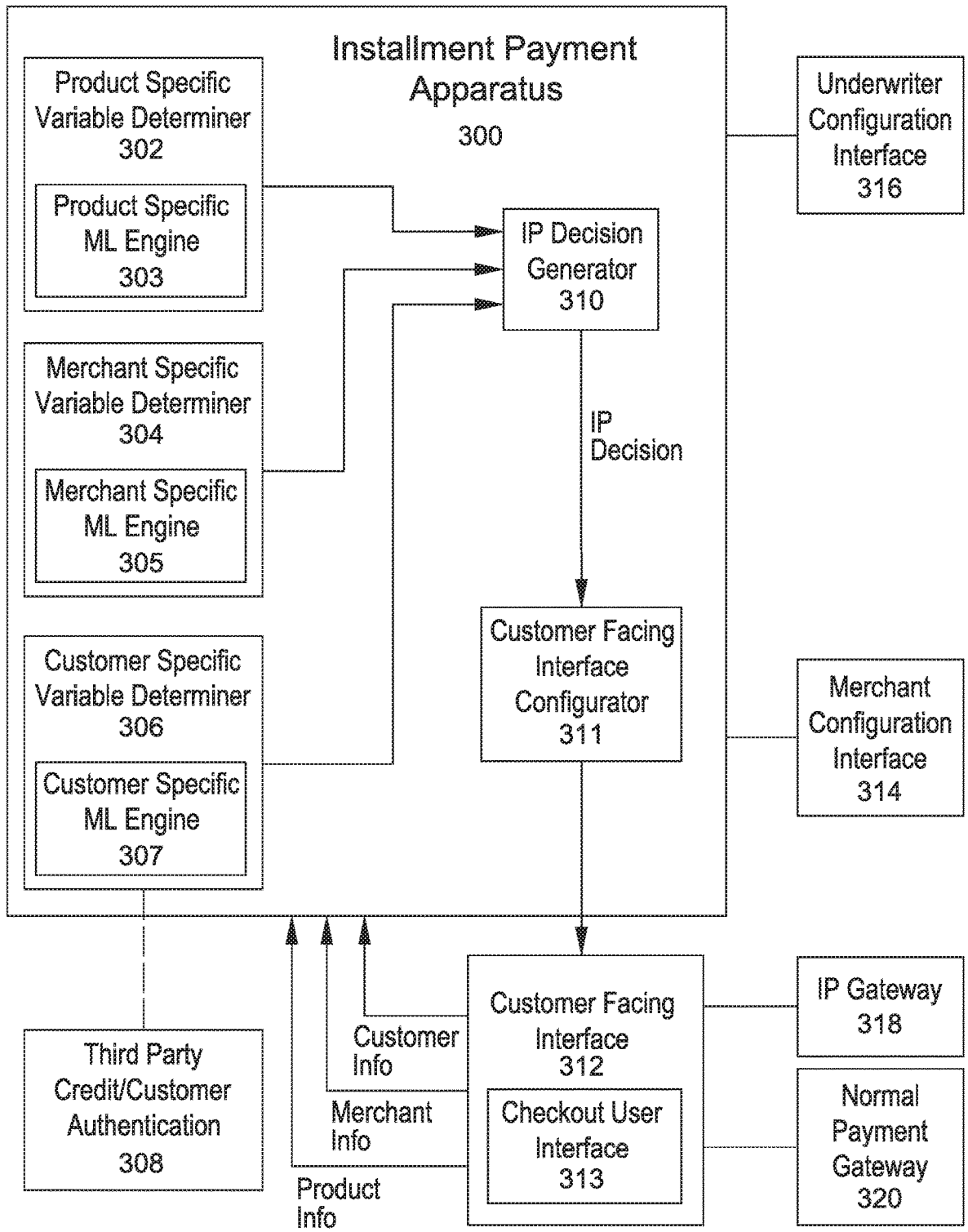
FIG. 3 illustrates a system that may be used to compute and provide installment payment offers to customers, according to one embodiment.

FIG. 3 illustrates a system for determining and delivering an installment payment decision to a customer, according to one embodiment. The system includes an installment payment apparatus 300, along with interior and auxiliary components.

The installment payment apparatus 300 includes a product specific variable determiner 302. The product specific variable determiner 302 may be a program, process, algorithm, or machine learning engine stored on non-transitory memory in a computing device. The product specific variable determiner 302 may be run on a generic processor of a computer device or may be implemented by dedicated circuitry, such as an application specific integrated circuit (ASIC), a graphics processing unit (GPU), or a field programmable gate array (FPGA). Optionally, the product specific variable determiner 302 includes a product-specific machine learning (ML) engine 303 that determines the product specific variable.

The product specific variable determiner 302 may access data related to the products of a merchant's store. Examples of data collected include product names, descriptions, manufacturers, and reviews. The product specific variable determiner 302 may also access and retrieve product data from other merchants, internal records of the e-commerce platform, and supplied third party information. In the case that the product-specific machine learning engine 303 is used in the implementation of the product specific variable determiner 302, the data used to "train" the engine may be provided by any one or more of the listed locations.

The product specific variable determiner 302 may, upon request, calculate or generate a value or recommendation based on the data provided. This value may be binary, an integer, a floating point number, or some other indicator.

The installment payment apparatus 300 also includes a merchant specific variable determiner 304. The merchant specific variable determiner 304 may be a program, process, algorithm, or machine learning engine stored on non-transitory memory in a computing device. The merchant specific variable determiner 304 may be run on a generic processor of a computer device or may be implemented by dedicated circuitry, such as an application specific integrated circuit (ASIC), a graphics processing unit (GPU), or a field programmable gate array (FPGA). Optionally, the merchant specific variable determiner 304 includes a merchant-specific machine learning (ML) engine 305 that determines the merchant specific variable.

The merchant specific variable determiner 304 may access data related to a merchant on an e-commerce platform. Examples of data collected include merchant personal and credit information, merchant history on the e-commerce platform (e.g. sales, customer satisfaction/reviews, other stores owned), the history of chargebacks against the merchant, and the settings and preferences of the merchant. The merchant specific variable determiner 304 may also access and retrieve product data from other merchants, internal records of the e-commerce platform, and supplied third party information. In the case that the merchant specific machine learning engine 305 is used in the implementation of the merchant specific variable determiner 304, the data used to "train" the engine may be provided by any one or more of the listed locations.

The merchant specific variable determiner 304 may, upon request, calculate or generate a value or recommendation based on the data provided. This value may be binary, an integer, a floating point number, or some other indicator.

The installment payment apparatus 300 further includes a customer specific variable determiner 306. The customer specific variable determiner 306 may be a program, process, algorithm, or machine learning engine stored on non-transitory memory in a computing device. The customer specific variable determiner 306 may be run on a generic processor of a computer device or may be implemented by dedicated circuitry, such as an application specific integrated circuit (ASIC), a graphics processing unit (GPU), or a field programmable gate array (FPGA). Optionally, the customer specific variable determiner 306 includes a customer-specific machine learning (ML) engine 307 that determines the customer specific variable.

The customer specific variable determiner 306 may access and retrieve data related to a customer on an e-commerce platform. Examples of data collected include customer personal and credit information, customer history on the e-commerce platform (e.g. purchase history, return history, reviews), and the history of chargebacks that a customer has initiated. The customer specific variable determiner 306 may also access and retrieve product data from other merchants, internal records of the e-commerce platform, and supplied third party information. In the case that the customer specific machine learning engine 307 is used in the implementation of the customer specific variable determiner 306, the data used to "train" the engine may be provided by any one or more of the listed locations.

The customer specific variable determiner 306 may, upon request, calculate or generate a value or recommendation based on the data provided. This value may be binary, an integer, a floating point number, or some other indicator.

The system further optionally also interfaces with a third party credit/customer authentication 308, to obtain data that is comprised of up to date customer credit information, such as scores, purchase history, and balances. This data is provided to the customer specific variable determiner as the majority of customer information utilized in producing a value. More generally, the third party credit/customer authentication 308 may provide information necessary to make a decision on the customer specific variable.

The installment payment apparatus 300 further includes an IP decision generator 310. The IP decision generator 310 may be a program, process, algorithm, or machine learning engine stored on non-transitory memory in a computing device. The IP decision generator 310 may be run on a generic processor of a computer device or may be implemented by dedicated circuitry, such as an application specific integrated circuit (ASIC), a graphics processing unit (GPU), or a field programmable gate array (FPGA).

The IP decision generator can communicate and receive values, data, or other indicators from all three of the product specific variable determiner 302, the merchant specific variable determiner 304, and the customer specific variable determiner 306. The IP decision generator 310 may also communicate with a customer facing interface 312 to relay IP decisions to be interpreted and displayed to a customer. Various examples of the calculation of an IP decision have been presented above, and these can be implemented in the IP decision generator.

Figure 5:
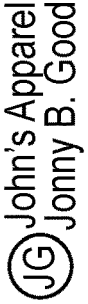

The customer facing interface 312 allows a customer to interact with the installment payment apparatus 300 and the greater e-commerce platform. The customer facing interface may be implemented as part of a website, application, or point of sale (POS) terminal; it provides a customer with information regarding products, payment, and merchant information, and may redirect a customer who wishes to complete a transaction to an IP gateway 318 or a normal payment gateway 320. An example graphical user interface (hereafter referred to as a GUI) that may be implemented to interact with a customer is depicted in FIG. 5, described below. The customer facing interface may also communicate new or updated product, merchant, and customer information to the installment payment apparatus 300. The customer facing interface 312 may include a checkout user interface 313.

In some embodiments, there is a customer facing interface configurator 311 interposed between the IP decision generator and the customer facing interface 312. The customer facing interface configurator 311 configures the customer facing interface 312 based on the IP decision, to include the IP option or not.

The IP gateway 318 is a customer payment gateway that is capable of fulfilling a transaction via installment payments. The IP gateway 318 is used when the IP option is offered to the customer (based on the IP decision), and selected by the customer. Purchase and card information may be transmitted from the IP gateway 318 to the customer facing interface 312 or the installment payment apparatus 300. The purchase processing of the IP gateway 318 may be provided by the merchant, the e-commerce platform, the underwriter, or another party.

The normal (e.g. non-IP) payment gateway 320 is a customer payment gateway capable of fulfilling a transaction in the conventional fashion without installment payments. The normal payment gateway 320 is used when the IP option has not been offered to the customer (based on the IP decision), or when the normal payment gateway is selected by the customer. In this case, the checkout is processed to complete the payment. This may involve for example completing the transaction via a single credit or debit payment or via multiple such payments, all processed during checkout. Purchase and card information may be transmitted from the IP normal payments to the customer facing interface 312 or the installment payment apparatus 300. The purchase processing of the normal payment gateway 320 may be provided by the merchant, the e-commerce platform, the underwriter, or another party. In some embodiments, the normal payment gateway 320 and IP gateway 318 are different and configured to handle transactions (or products in the same transaction) with different risk profiles. For example, the normal payment gateway 320 is configured to handle low or lower risk transactions/products (based on the IP decision) while the IP gateway 318 is configured to handle high or higer-risk transactions or products.

The system further includes an underwriter configuration interface 316, which allows an underwriter of the installment payments to configure the settings of the installment payment apparatus 300 based on their preferences and the types of purchases, merchants, and products they wish to support with installment payment options. An example GUI that may be implemented to configure the installment payment apparatus 300 is provided in FIG. 7 described below.

A merchant configuration interface 314 may also be implemented as a part of the system. The merchant configuration interface 314 allows a merchant to decide whether to allow IP offers to be made to customers on one or more of their products. An example GUI that may be implemented for merchant configuration is provided in FIG. 6, described below.

Figure 4:
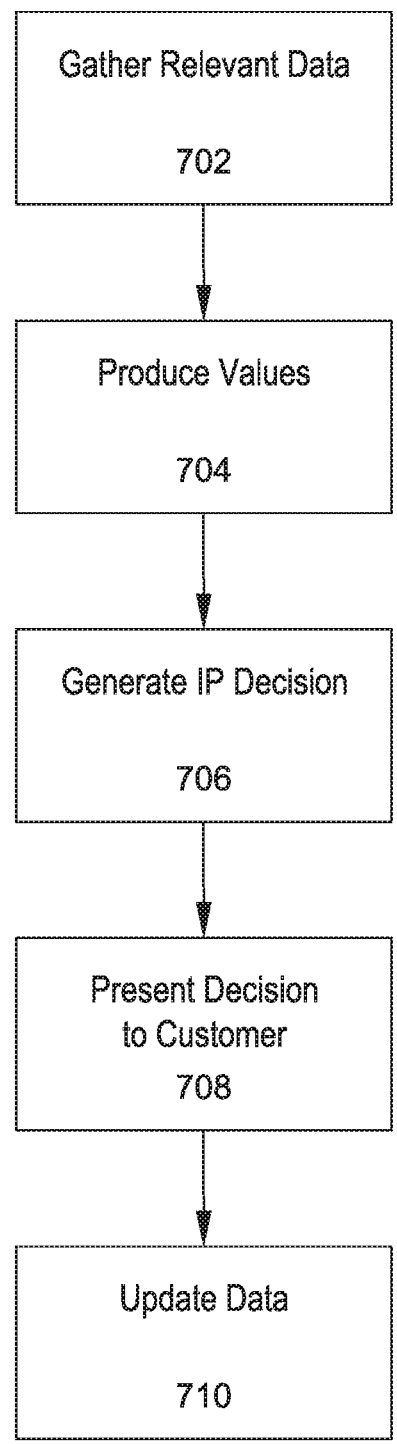
FIG. 4 is a flowchart of a method for computing and providing installment payment offers to customers, according to one embodiment.

Should a customer try to make a purchase from a merchant that supports the offering of installment payments, a decision must be reached regarding whether IP is offered or not, and what the terms of the IP agreement are. FIG. 4 illustrates a method of making a decision in greater detail, according to one implementation.

Upon a customer checking out and entering their personal and/or card information, the following method may be performed. At step 702, the installment payment apparatus 300 gathers relevant data from available sources, within the preferences and boundaries set by the underwriter. Specifically, the product specific variable determiner 302 retrieves product data on the items in the customer's order, the merchant specific variable generator 304 retrieves data relating to the merchant fulfilling the order, and the customer specific variable determiner 306 gathers information on the customer. Examples of the specific types of data have been listed previously. The process at each variable determiner may occur simultaneously in parallel or sequentially in series.

At step 704, a resulting value is produced at each variable determiner, which may be a binary value, an integer, a floating point number, or some other indicator. These values are henceforth referred to as P, M, and B for each of the product specific variable determiner 302, the merchant specific variable determiner 304, and the customer specific variable determiner 306, as noted previously. Other values may also be passed on as additional information.

At step 706, the values are received by the IP decision generator 310, and an IP decision is generated. The IP decision generator utilizes some function (i.e. "F") to determine the IP decision. F is a function of P, and optionally one or both of M and B. The function may be implemented in numerous ways, with examples described previously, such as a weighted sum, a binary test of one or more values, a comparison to threshold values, any combination of such functions. The IP decision generator 310 consults the merchant configured settings and the underwriter configured settings to ensure its decision falls within the defined parameters.

If the decision is compliant with all configured settings, it is presented to the customer at step 708. The customer facing interface configurator 311 configures the customer facing interface 312 to display the results of the IP decision. If favourable, the IP decision presented to the customer may include payment amounts, length of installment term, and interest rates. In some implementations, the IP decision may have multiple options with different amounts and terms. In this case, the customer may be permitted to choose their preferred installment payment plan If an IP decision in unfavourable (i.e. IP is decided to be unavailable), this information may be communicated to the customer (e.g. "this order is not eligible for installment payments") or the customer may not receive any indication. In some embodiments, once the customer confirms their preferred installment plan and completes the checkout process, the platform is configured to route the transaction using one or both of the normal payment gateway 320 and IP gateway 318.

At step 710, the data used by the installment payment apparatus 300 may be updated. Examples of recorded information include current customer credit and/or personal information, the results of the decision, the values calculated by the variable determiner, and potentially transaction/order information.

The various steps and interfaces in the system require input from the customer, the merchant, and the underwriter. Various user interfaces to receive such input are disclosed below, and may be implemented as part of the system.

Customer Facing Interface 312

FIG. 5 illustrates an example GUI that may be used as a customer facing interface, according to one implementation. The interface may include a search bar 502 which is capable of using keywords to locate information on the online store, app, or other interface which may include products, shipping information, or other information regarding the merchant or products offered. A selection of site headers 504 may be implemented for convenient navigation of the site.

When an IP decision is reached, it may be displayed to the customer as a part of the checkout process. An example installment payment offer 506 is displayed as part of the customer facing interface 316. Prices, payment terms, and interest rates are provided as part of the installment payment offer 506. Items of an order that are eligible for installments are listed and included in the installment offer, while ineligible products are listed separately and added onto the down payment for the installment offer. In some embodiments, the offer may be partially configured by the customer. For example, the payment terms (i.e. the repayment time) may be decided by the customer within the limits set by the IP decision provided by the IP decision generator 310; the amount of payments will be recalculated as a result. The installment payment offer 506 includes two buttons which may be chosen by the customer (e.g. with a click, tap, or gesture). The "Pay in Installments" button routes the customer to the IP gateway 318; the "Proceed to standard checkout" button routes the customer to the normal payment gateway 320.

In some embodiments, when the customer is offered the installment payment option, the customer is also allowed to select, through a user interface, how many installments to divide the purchase over.

Typically, all the payments, including the initial payment and subsequent payments use the same payment mechanism (e.g. credit card, bank card, etc.). However, in some embodiments, a customer is given the option of using a different payment mechanism from payment to payment upon confirmation that the multiple payment mechanisms are identified with the same customer.

According to one embodiment, the GUI includes an order summary bar 508, which lists the items to be purchased as well as their prices. Other sums, additions, or subtractions to the price may also be listed, such as subtotals, totals, taxes, shipping costs, and discounts.

Merchant Configuration Interface 312

Figure 6:
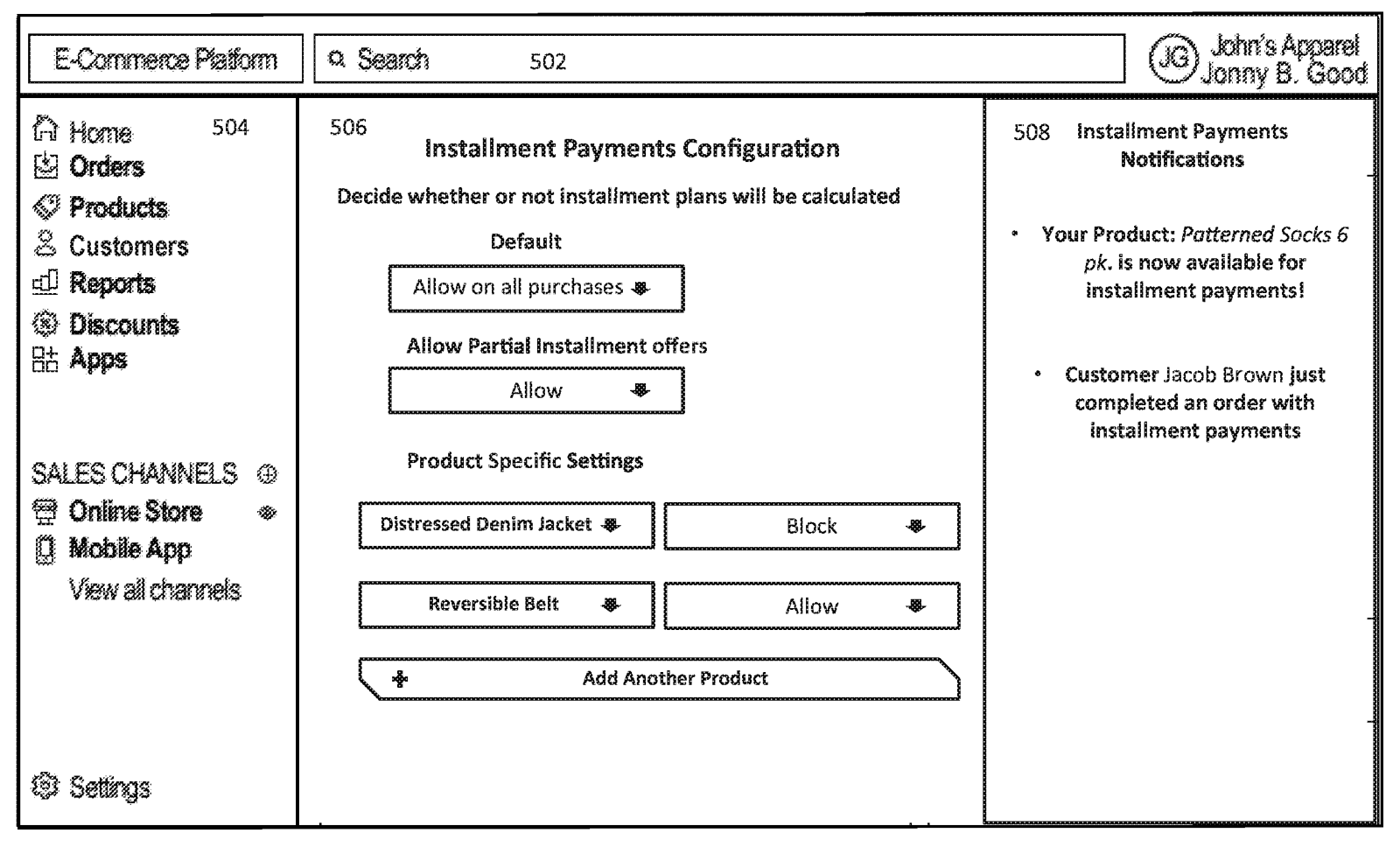

FIG. 6 illustrates an example GUI that may be used as a merchant configuration interface, according to one implementation. The interface may include a search bar 602 which is capable of using keywords to locate information on the online store, app, or other interface which may include products, shipping information, or other information regarding the merchant or products offered. A sidebar menu 604 is included in the GUI as a potential navigation tool to provide shortcuts to other pages (e.g. orders, product pages, financial information). An installment payment configuration menu 606 is provided as a part of the GUI ,according to one embodiment; it consist of one or more tools such as empty fields, selection boxes, drop down selection menus, and/or slider selections. The installment payment configuration interface 606 allows a merchant to decide whether to let installment payments be offered on their products and whether a combination of installments and immediate purchases can be used by a customer. Specific products can also have preferences assigned to them by a merchant. A "no" from the merchant overrides any IP decision, but a "yes" from the merchant is still subject to the IP decision made by the IP decision generator 310.

A notification bar 608 is also included in the GUI. The notification bar may list for the merchant orders that are being made on installment payments as well as updates from the e-commerce platform and/or the underwriter regarding products that are available or unavailable for installment payments, policy updates, and refunded or cancelled IP orders that a merchant must respond to.

Underwriter Configuration Interface 316

FIG. 7 illustrates an example GUI that may be used as a merchant configuration interface, according to one implementation. The interface may include a search bar 702 that may be used to locate information on the underwriter's management platform, such as statistics, finances, related companies/clients, and relevant applications and websites. The underwriter may or may not be the e-commerce platform. The interface further includes a header menu 704 that allows for easy access and navigation to important or frequently used pages or interfaces of the management platform.

An installment payment configuration menu 706 is included as a part of the GUI. The installment payment configuration menu allows an underwriter to control certain aspects or functionality of the installment payment apparatus 300, namely, any one or more of the product specific variable determiner 302, the merchant specific variable determiner 304, and the customer specific variable determiner. Some examples of settings that could be changed or adjusted include risk thresholds, data to be included, the weighting of the measurements/values in determining the final decision, and specific permissions or overrides available to the underwriter. The settings may be segregated into basic and more specific advanced features as shown. An underwriter may choose to save or discard their changes by selecting either the "Apply Changes" or "Cancel Changes", respectively. In another implementation, default settings may be available.

The GUI further includes a notification bar 708. The notification bar 708 may provide easy to access data regarding large data updates, merchant information, updates to the installment payment apparatus 300, and other alerts to the underwriter.

Although the foregoing has been described with reference to certain specific embodiments, various modifications thereof will be apparent to those skilled in the art without departing from the scope of the claims appended hereto.

Numerous modifications and variations of the present disclosure are possible in light of the above teachings. It is therefore to be understood that within the scope of the appended claims, the disclosure may be practiced otherwise than as specifically described herein.

The invention claimed is:

1. A computer-implemented method comprising:
using at least one processor and memory to perform steps of:
selecting an initial set of customers on an e-commerce system, wherein the initial set of customers have previously interacted with the e-commerce system;
selecting an initial set of products sold on the e-commerce system;
generating a first machine learning model trained to map product-specific data to product-specific values, the generating including:
collecting product-specific data regarding the initial set of products from the e-commerce system, the product-specific data regarding the initial set of products including one or more of product descriptions, product titles, or product images for products of the initial set of products;
mapping the initial set of products to product-specific values, the product specific values being risk category codes;
creating a first training set based on the initial set of products, the product-specific data regarding the initial set of products, and the mapped product-specific values; and
training the first machine learning model using the first training set;
generating a second machine learning model trained to map customer-specific data to customer-specific values, the generating including:
collecting customer-specific data regarding the initial set of customers, the customer-specific data regarding the initial set of customers including one or more of information about transaction history, information about behaviour while interacting with the e-commerce platform, or credit information;
correlating the customer-specific data with chargeback likelihood;
creating a second training set based on training data and the correlation with chargeback likelihood; and
training the second machine learning model using the second training set;
providing the first machine learning model with access to product-specific data for other products on the e-commerce platform;
providing the second machine learning model with access to customer-specific data for other customers on the e-commerce platform;
receiving input over a network defining an online shopping cart holding products selected for purchase from a store of a merchant;
receiving, over the network, a request to initiate a checkout process for the online shopping cart;
responsive to the request to initiate the checkout process for the online shopping cart, performing the checkout process for the online shopping cart, wherein an installment plan is offered for the checkout of the online shopping cart based on the first and second machine learning models, the performing including:
determining that the installment plan option should be offered for checkout of the online shopping cart, the determining including:
using the first machine learning model to determine product-specific values for the products held in the online shopping cart;
using the second machine learning model to determine a customer-specific value for a customer associated with the online shopping cart;
making a respective installment plan (IP) decision for each product held in the online shopping cart based at least on the product-specific value for that product and the customer-specific value, and
determining that all of the respective IP decisions are positive;
responsive to the determination that the installment plan purchase option should be offered for the checkout of the online shopping cart:
providing a checkout user interface to allow confirmation of the checkout process, the checkout user interface including a mechanism for selecting between the offered installment plan purchase option and a single payment option,
receiving, on the checkout user interface, a selection confirming that checkout should be completed using the installment plan purchase option, and
processing the checkout information using the installment plan purchase option.

2. The method of claim 1 wherein: the IP decision in respect of the online shopping cart is also based on a merchant specific value.

3. The method of claim 2 further comprising:
maintaining chargeback history for the merchant online sales channel;
determining the merchant specific value based on the chargeback history; and
from time to time, updating the merchant specific value to reflect changes in the chargeback history.

4. The method of claim 1 further comprising:
receiving, over the network, configuration inputs to configure how the IP decision is made from at least one of:
an underwriter configuration interface; or
a merchant configuration interface.

5. An installment payment apparatus comprising:
a processor and a memory, the installment payment apparatus configured to:
select an initial set of customers on an e-commerce system, wherein the initial set of customers have previously interacted with the e-commerce system;
select an initial set of products sold on the e-commerce system;
generate a first machine learning model trained to map product-specific data to product-specific values, wherein generating the first machine learning model includes:
collecting product-specific data regarding the initial set of products from the e-commerce system, the product-specific data regarding the initial set of products including one or more of product descriptions, product titles, or product images for products of the initial set of products;
mapping the initial set of products to product-specific values, the product specific values being risk category codes;
creating a first training set based on the initial set of products, the product-specific data regarding the initial set of products, and the mapped product-specific values; and
training the first machine learning model using the first training set;
generate a second machine learning model trained to map customer-specific data to customer-specific values, wherein generating the second machine learning model includes:
collecting customer-specific data regarding the initial set of customers, the customer-specific data regarding the initial set of customers including one or more of information about transaction history, information about behaviour while interacting with the e-commerce platform, or credit information;
correlating the customer-specific data with chargeback likelihood;
creating a second training set based on training data and the correlation with chargeback likelihood; and
training the second machine learning model using the second training set;
provide the first machine learning model with access to product-specific data for other products on the e-commerce platform;
provide the second machine learning model with access to customer-specific data for other customers on the e-commerce platform;
receive input over a network defining an online shopping cart holding products selected for purchase from a store of a merchant;
receive, over the network, a request to initiate a checkout process for the online shopping cart;
responsive to the request to initiate the checkout process for the online shopping cart, perform the checkout process for the online shopping cart, wherein an installment plan is offered for the checkout of the online shopping cart based on the first and second machine learning models, the performing including:
determine that the installment plan option should be offered for checkout of the online shopping cart, by:
using the first machine learning model to determine product-specific values for the products held in the online shopping cart;
using the second machine learning model to determine a customer-specific value for a customer associated with the online shopping cart;
making a respective installment plan (IP) decision for each product held in the online shopping cart based at least on the product-specific value for that product and the customer-specific value, and
determine that all of the respective IP decisions are positive;
responsive to the determination that the installment plan purchase option should be offered for the checkout of the online shopping cart:
provide a checkout user interface to allow confirmation of the checkout process, the checkout user interface including a mechanism for selecting between the offered installment plan purchase option and a single payment option,
receive, on the checkout user interface, a selection confirming that checkout should be completed using the installment plan purchase option, and
process the checkout information using the installment plan purchase option.

6. The installment payment apparatus of claim 5 further configured to:
receive input over a network defining an online shopping cart from a customer facing interface, the online shopping cart holding products selected for purchase from a store of a merchant and for receiving, over the network, a request to initiate a checkout process for the online shopping cart;
responsive to the request to initiate the checkout process for the online shopping cart, perform the checkout process for the online shopping cart, wherein an installment plan is offered for the checkout of the online shopping cart based on the first and second machine learning models, the performing including:
determining that the installment plan should be offered for checkout of the online shopping cart, the determining including:
using the first machine learning model to determine product-specific values for the products held in the online shopping cart;
using the second machine learning model to determine a customer-specific value for a customer associated with the online shopping cart;
making a respective IP decision for each product held in the online shopping cart based at least on the product-specific value for that product and the customer-specific value, and
determining that all of the respective IP decisions are positive; and
responsive to the determination that the installment plan purchase option should be offered for the checkout of the online shopping cart:
providing a checkout user interface to allow confirmation of the checkout process, the checkout user interface including a mechanism for selecting between the offered installment plan purchase option and a single payment option,
receiving, on the checkout user interface, a selection confirming that checkout should be completed using the installment plan purchase option,
processing the checkout information using the installment plan purchase option.

7. The installment payment apparatus of claim 6 further comprising:
- a merchant specific value determiner configured to determine a merchant specific value;
- wherein the IP decision generator makes the IP decision in respect of the online shopping cart also based on the merchant specific value.

8. The installment payment apparatus of claim 7 further comprising:
- a computer readable storage maintaining chargeback history for the merchant online sales channel;
- wherein the merchant specific value determiner determines the merchant specific value based on the chargeback history, and from time to time, updates the merchant specific value to reflect changes in the chargeback history.

9. The installment payment apparatus of claim 6 further comprising:
- an underwriter configuration interface for receiving a configuration inputs to configure how the IP decision is made from an underwriter.

10. The installment payment apparatus of claim 6 further comprising:
- a merchant configuration interface for receiving a configuration inputs to configure how the IP decision is made from a merchant.

11. An e-commerce platform comprising the installment payment apparatus of claim 6.

* * * * *